US006743455B2

(12) United States Patent
Hashisaka et al.

(10) Patent No.: US 6,743,455 B2
(45) Date of Patent: Jun. 1, 2004

(54) MULTI-LAYER FOOD PRODUCTS

(75) Inventors: Ann E. A. Hashisaka, Anaheim, CA (US); Virender Sethi, Anaheim, CA (US); Amy Lammert, Monrovia, CA (US); Mario Mikula, Mission Viejo, CA (US)

(73) Assignee: ConAgra Grocery Products Company, Irvine, CA (US)

( * ) Notice: Subject to any disclaimer, the term of this patent is extended or adjusted under 35 U.S.C. 154(b) by 30 days.

(21) Appl. No.: 10/274,581

(22) Filed: Oct. 21, 2002

(65) Prior Publication Data

US 2003/0044494 A1 Mar. 6, 2003

Related U.S. Application Data

(62) Division of application No. 09/296,694, filed on Apr. 21, 1999.

(51) Int. Cl.[7] .................... A23L 1/27; A23L 1/275; A23L 1/187
(52) U.S. Cl. ............... 426/249; 426/103; 426/426; 426/250; 426/573; 426/579; 426/583; 426/540; 426/578
(58) Field of Search ............... 426/249, 250, 426/573, 579, 583, 540, 578, 103

(56) References Cited

U.S. PATENT DOCUMENTS

| | | | |
|---|---|---|---|
| 1,578,122 A | 3/1926 | Higgins |
| 2,484,543 A | 10/1949 | Baldwin et al. |
| 2,533,221 A | 12/1950 | Cleland et al. |
| 2,651,576 A | 9/1953 | Longenecker et al. |
| 2,841,499 A | 7/1958 | Grossi |
| 2,932,572 A | 4/1960 | Sarich |
| 3,111,411 A | 11/1963 | Livingston |
| 3,249,444 A | 5/1966 | Bollenback et al. |
| 3,336,141 A | 8/1967 | Frisina |
| 3,552,980 A | 1/1971 | Cooper et al. |
| 3,579,355 A | 5/1971 | Wyss et al. |
| 3,582,358 A | 6/1971 | Bundus |
| 3,615,591 A | 10/1971 | Newlin et al. |
| 3,615,592 A | 10/1971 | Peterson |
| 3,618,588 A | 11/1971 | Anwar et al. |
| 3,734,745 A | 5/1973 | Cassanelli et al. |
| 3,860,728 A | 1/1975 | Tanner et al. |
| 3,924,016 A | 12/1975 | Walters et al. |
| 3,937,851 A | 2/1976 | Bellanca et al. |
| 3,969,514 A | 7/1976 | Tiemstra |
| 3,969,536 A | 7/1976 | Ikeda et al. |
| 4,113,505 A | 9/1978 | Bellanca et al. |
| 4,138,271 A | 2/1979 | Ohira et al. |
| 4,167,422 A | 9/1979 | Bellanca et al. |
| 4,304,792 A | 12/1981 | Sreenivasan et al. |
| 4,316,917 A | 2/1982 | Antoshkiw et al. |
| 4,325,743 A | 4/1982 | Tibbetts et al. |
| 4,414,234 A | 11/1983 | Sreenivasan et al. |
| 4,560,564 A | 12/1985 | Bruno, Jr. et al. |
| 4,568,553 A | 2/1986 | Murray et al. |
| 4,614,662 A | 9/1986 | Ramaswamy |
| 4,717,571 A | 1/1988 | Okonogi et al. |
| 4,744,991 A | 5/1988 | Serpelloni |
| 4,753,766 A | 6/1988 | Pinsolle |
| 4,758,444 A | 7/1988 | Terauchi et al. |
| 4,759,936 A | 7/1988 | Best et al. |
| 4,869,917 A | 9/1989 | Cunningham et al. |
| 4,906,489 A | 3/1990 | Flango, Jr. et al. |
| 4,915,971 A | 4/1990 | Fennema et al. |
| 5,019,405 A | 5/1991 | Sapers |
| 5,114,492 A | 5/1992 | Wolf et al. |
| 5,151,293 A | 9/1992 | Vassiliou |
| 5,171,603 A | 12/1992 | Singer et al. |
| 5,192,566 A | 3/1993 | Cox et al. |
| 5,202,137 A | 4/1993 | Duffy et al. |
| 5,227,189 A | 7/1993 | Vassiliou |
| 5,338,554 A | 8/1994 | Vogt et al. |
| 5,387,427 A | 2/1995 | Lawrence et al. |
| 5,417,990 A | 5/1995 | Soedjak et al. |
| 5,633,031 A | 5/1997 | Zablocki et al. |
| 6,110,515 A | * 8/2000 | Clechet et al. ............... 426/306 |
| 6,235,320 B1 | 5/2001 | Daravingas et al. |
| 6,294,213 B1 | 9/2001 | Hashisaka et al. |
| 6,488,975 B1 | * 12/2002 | Sethi et al. .................. 426/431 |
| 6,645,540 B2 | * 11/2003 | Hashisaka et al. .......... 426/249 |

FOREIGN PATENT DOCUMENTS

EP    0 686 354 B1    9/1999

OTHER PUBLICATIONS

D.D. Williamson, The Basics of Caramel Colors, Apr. 17, 1999; <www.caramel.com/solution/article2.htm>; pp. 1–9.

D.D. Williamson, Caramel Color, A Love Story; pp. 1–20.

Kuntz, Lynn A., Editor, Food Product Design, Mar. 1998; Applications: Colors Au Naturel; pp. 60–74.

Food Technology; Products & Technologies—Ingredients; Jun. 1998, vol. 52, No. 6, pp. 70–82.

Warner•Jenkinson, Brochure: What is Beta Carotene?; pp. 1–3.

Food Product Design, Acid–Stable Natural Colors Offer Opportunities for Formulations, Jun. 1998, p. 145.

* cited by examiner

Primary Examiner—N. Bhat
(74) Attorney, Agent, or Firm—Bingham McCutchen, LLP

(57) ABSTRACT

Disclosed is a multi-layer gel-based food product, such as pudding, in which color migration from one layer to an adjacent layer is minimized. The multi-layer food product comprises a first milk-based, gel-based layer containing a dispersed oil phase and an oil soluble color within the oil phase. The first gel-based layer has a first color. A second gel-based layer, preferably also a milk-based layer, is adjacent the first gel-based layer. The second gel-based layer has a second color different from the first color. To further minimize color migration, the second gel-based layer can also contain a dispersed oil phase and an oil soluble color within the oil phase.

12 Claims, No Drawings

MULTI-LAYER FOOD PRODUCTS

CROSS-REFERENCE TO RELATED APPLICATION

This application is a divisional of U.S. application Ser. No. 09/296,694, filed Apr. 21, 1999, the entire disclosure of which is incorporated herein by reference.

FIELD OF THE INVENTION

This invention relates to a multi-layer food product, and more particularly, to a multi-layer gel-based dessert product, such as pudding.

BACKGROUND

Consumers regularly eat pudding and other gel-based dessert products, some of which are non-dairy based. Consumers' desire for convenient foods led to the development of such items that require little or no advance preparation by the consumer before eating. Beginning approximately 30 years ago, consumers were offered these types of products in ready-to-eat, single-serve, portable containers. Initially these products were sold as shelf-stable, canned products. These canned products, such as pudding, were subjected to retort processing and did not as closely approximate home-made pudding as did the later developed aseptically packaged puddings.

As consumers begin to have more choices with regard to wholesome, nutritious snacks, manufacturers have developed new markets and innovated to remain competitive in this area. A new market for milk-based pudding and other dessert gels is the entry into the refrigerated section of the supermarket. One of the innovations has been the packaging changeover from opaque plastic to clear plastic cups, allowing the consumer to see that which is being purchased. Industry's move to clear plastic cups has engendered other innovations, such as the layering of different flavor puddings or other gelled desserts into the same cup or container. These improvements also are being used with shelf-stable puddings and other gel-based desserts that are stored at room temperature for long periods of time.

The color of a food or beverage is one of the first attributes recognized by the senses of the purchaser and intended consumer of the product. Typically, when a manufacturer makes pudding, or other dessert product which has more than one flavor layer, the manufacturer colors the layers differently to make the product more attractive and commercially appealing. Current manufacturing methods have concentrated on using oil or water dispersed lake colorants to produce the desired colors. For example, manufacturers have tried to produce pudding products having a top layer that is red, yellow, or brown color in color next to a bottom layer that is a contrasting color, such as yellow or white. Specific examples include multi-layer pudding products with a bottom layer of banana-yellow with a top layer of cream-white or a bottom layer of apple-yellow and a top layer of golden caramel color.

Color migration can be defined as the mobility of a colorant in a pudding formulation into an adjacent layer of pudding, that it was not intended to be in, that results in the lightening or darkening otherwise distorting of the adjacent layer(s) during the shelf life of the pudding product. In a single flavor/color pudding cup, the migration of color has not been an issue. However, in a multi-layered pudding cup, the migration of the color changes the appearance of the product from what it was intended to be, which results in the product not appearing as it was originally designed to appear to the consumers, and thus has a decreased consumer acceptance. For example, when the bottom layer is a darker color and the top layer is a lighter color, the darker color migrates from the bottom layer up into the upper lighter layer causing it to darken, the lighter color migrates down into the bottom layer causing it to lighten, or both.

For coloring flavor layers outside the caramel color range (e.g., from light yellow to dark brown) colorants typically have been provided by way of alumina-based oil-dispersable lakes comprised of a mix of FD&C dyes (e.g., a combination of Red No. 40 and Blue No. 1). The resulting monochromatic single layer appears to be of uniform coloration. These FD&C lakes are insoluble in oil and water. These traditional oil-dispersable lakes comprised of a mix of FD&C dyes do not work very well with a multi-layer, multi-color pudding, or with other gel-based desserts. The colors tend to migrate, thus bleeding color from one layer to another, therefore they appear undesirable to the consumer.

There has existed a definite need for a method for preparing multi-layered, gel-based dessert products having at least one layer that contains a natural oil soluble color and that exhibits reduced migration into adjacent layer(s). This present invention satisfies these and other needs.

SUMMARY OF THE INVENTION

In accordance with the invention, there has been found a way to reduce color migration in multi-layer food products, such as dessert products from gels having a continuous aqueous phase and a dispersed colloidal oil phase. In one embodiment, the invention is directed to a multi-layer food product comprising a first milk-based, gel-based layer containing a dispersed oil phase and an oil soluble color within the oil phase. The first gel-based layer has a first color. A second gel-based layer, preferably also a milk-based layer, is adjacent the first gel-based layer. The second gel-based layer has a second color different from the first color. Migration of the oil-soluble food color from the first gel-based layer into the second gel-based layer is minimized. To further minimize color migration, the second gel-based layer can also contain a dispersed oil phase and an oil soluble color within the oil phase. The gel-based layers of the products of the invention preferably comprise pudding or yogurt.

Representative natural, oil soluble colors include beta-carotene, annatto, paprika oleoresin, or lycopene, either alone or in combination. In some embodiments, the layer that contains the natural oil soluble colorant also contains a caramel colorant, preferably a negatively charged caramel colorant having a weight average molecular weight of between about 200,000 Daltons and 650,000 Daltons, present in an amount between about 0.02% and about 0.08% by weight.

The multi-layer gel-based dessert products are made by introducing a gel-based dessert product containing the first colorant into a container to form a first layer and then introducing additional gel-based product containing the second colorant into the container to form a second layer adjacent to the first. The resulting multi-layer product exhibits reduced color migration between the two layers.

DETAILED DESCRIPTION OF THE PREFERRED EMBODIMENTS

To exemplify the product and process in accordance with the invention, the following description concentrates primarily of a multi-layered pudding product and a method for making the multi-layered product. It should be readily apparent to the skilled artisan that the description with little modification, might also apply to the preparation of other gel-based dessert products including both other milk-based gel products, such as yogurt, as well as their non-dairy counterparts. The multi-layered, gel-based dessert product of this invention has a continuous aqueous phase and a dispersed colloidal oil phase.

The pudding made in accordance with this invention has at least two adjacent layers. Each pudding layer is prepared from conventional pudding ingredients, typically including nonfat milk, water, a sweetener, an emulsified fat and/or oil, a thickener, particularly a starch thickener, and at least on emulsifier/stabilizer. Additional ingredients include non-fat milk solids, pieces of fruit, salt, colorants, and flavorants. A typical pudding formulation is given in the table below. Certain ingredients may not be present in certain types of pudding such as the intentional absence of fat or oil in "fat free" pudding. Similarly, not all gel desserts (i.e., "non-dairy") need contain milk products.

| Ingredient | Acceptable Range (% weight) | Preferred Range (% weight) |
| --- | --- | --- |
| Nonfat Milk | 30.0–70 | 35.0–45 |
| Water | 5.00–20 | 10.0–15 |
| Sweetener | 0.05–30 | 0.50–25 |
| Fat | 0.50–15 | 0.50–10 |
| Thickener | 2.00–10 | 3.00–8.0 |
| Salt | 0.05–2.0 | 0.75–1.25 |
| Emulsifier/Stabilizer | 0.01–2.0 | 0.05–1.50 |
| Colors | 0.01–2.0 | 0.02–1.25 |
| Flavors | 0.05–2.0 | 0.10–1.50 |

The pudding layers are typically made with from about 30 to about 70 wt. %, preferably from about 35 to about 45 wt. % skim milk and/or non-fat milk and from about 5 to about 20 wt. %, preferably from about 10 to about 15 wt. % water. For those puddings which contain a low level of fat, low-fat or whole milk may also be used as ingredients. Throughout this specification and the claims, all weight percentages are based on the total weight of the ingredients used to make the pudding layer.

The sweetener component employed in formulating the pudding layers of the present invention is chosen to provide a desired degree of sweetness and solids to the final pudding product. Sucrose is the preferred sweetener component. Generally, sucrose is used in an amount from about 0.05 to about 30 wt. %, preferably from about 0.5 to about 25 wt. %. Other suitable sweeteners that can be employed as all or a portion of the sweetener component include other sweet mono-, di- or polysaccharides, such as dextrose, fructose, corn syrups, corn syrup solids, high fructose corn syrups, and the like. Nutritive and non-nutritive, intensive sweeteners such as saccharin, aspartame, Sucralose™, Acesulfame K™ and the like may also be employed as all or part of the sweetener component. The use of intensive sweeteners may be accompanied by use of suitable sweet or non-sweet bulking agents to provide a desired solids level; however, bulking agents will typically not be needed. All of theses components are to be included in the term "sweetener" as employed in this invention; provided, however, that in the case of syrups, only the solids portion is included as a sweetener.

Any suitable thickening agent can be employed to provide the desired firmness or texture. In preferred embodiments, the thickening agent is a starch, including corn starch, potato starch, tapioca starch, rye flour, wheat flour, and the like, modified or unmodified. In most preferred embodiments the thickening agent is a combination of modified corn and modified waxy corn starches. Typically, the starch is present in an amount from about 2 to about 10 wt. %, preferably from about 3 to about 8 wt. %.

Fat emulsions are usually incorporated in the pudding composition to improve the textual quality and mouthfeel of the pudding. The fat emulsion usually contains a vegetable fat, such as a partially hydrolyzed vegetable oil, in an amount from about 0.5 to about 15 wt. %, preferably from about 0.5 to about 10 wt. %.

The pudding composition of the present invention also contains at least one emulsifier/stabilizer component which aids in dispersing and mixing of ingredients and contributes to the desired firm, smooth texture. A preferred emulsifier/stabilizer is sodium stearoyl-2-lactylate. Other suitable emulsifier/stabilizer ingredients include mixtures of mono- and di-glycerides prepared by direct esterfication of edible fatty acids and glycerine, propylene glycol esters of fatty acids, and lecithin. Protein stabilizers, such as disodium phosphate are also useful in accordance with the invention. The emulsifier/stabilizer(s) is generally present in an amount from about 0.01 to about 2 wt. %, preferably from about 0.05 to about 1.5 wt. %.

When selecting a color, natural oil soluble colors may be dispersed in the oil phase, and preferably be homogenized. One example is to use annatto to give the appearance of "banana-yellow" and to use beta-carotene to give a "lemon-yellow" color to one of the layers.

Any natural oil soluble food color may be used in accordance with this invention. Representative colors include beta-carotene, annatto, paprika oleoresin, and lycopene. These natural oil soluble colorants can be dispersed in the colloidal oil phase of the pudding or gel-based dessert. Because the hydrophobic oil does not migrate within the continuous aqueous phase, these oil soluble colorants become entrapped in the oil matrix and do not disperse throughout the aqueous phase, therefore they do not migrate from one layer to another.

In some embodiments, it is possible to create a color that is darker than annatto, beta-carotene, or other natural oil soluble colors, yet is lighter than the lightest caramel color available. This is accomplished by including a natural oil soluble color in the oil phase and then a percentage of caramel colorant that, preferably is negatively charged, and more preferably has a weight average molecular weight of between about 200,000 Daltons and 650,000 Daltons, to tint the oil phase. The use of caramel colorants in multi-layer gel-based dessert products is described in U.S. Pat. No. 6,294,213, entitled Method For Reducing Color Migration In Multi-Layered, Caramel Colored, Gel-Based Dessert Products and the Products So Produced, which is incorporated herein by reference. To tint the oil phase mixture, use from about 0.02% to about 0.08% caramel color by weight. Doing so will yield colors such as "tan" and yellows with more "warmth" than the light-yellow "banana" color or the bright-yellow "lemon" color that one obtains from simply using annatto or beta-carotene, respectively.

The formulation used for both pudding layers can also contain conventional pudding ingredients such as salt, typically in an amount from about 0.05 to about 2 wt. %, preferably from about 0.75 to about 1.25 wt. %, and flavorants, as for example vanilla, strawberry, cocoa, caramel, and the like. The flavorants can be used in the pudding composition at any desired concentration depending upon the particular flavoring desired. Typically, the flavorants are present in an amount from about 0.05 to about 2 wt. %, preferably from about 0.1 to about 1.5 wt. %. Other ingredients that can be included in one or both of the pudding layers include non-fat milk solids and pieces of fruit.

According to one method for preparing the multi-layer pudding in accordance with the invention, a bottom pudding the layer is prepared first by combining the liquid ingredients, including a portion of the water having a temperature of between about 150° F. and about 180° F., preferably about 170° F.; with from about 30 to about 70 wt. %, preferably from about 35 to about 45 wt. % heated skim milk and/or non-fat milk; from about 0.5 to about 15 wt. %, preferably from about 0.5 to about 10 wt. %. vegetable oil; and from about 0.01 to about 2 wt. %, preferably from about 0.05 to about 1.5 wt. %. emulsifier/stabilizer(s). If the bottom layer is to contain a natural oil soluble colorant, from about 0.01 to about 2 wt. %, preferably from about 0.02 to about 1.25 wt. % colorant can be added at this time. Alternatively, the natural oil soluble colorant can be added at any time during the process, up until the ingredients are cooked and the gel is formed. If the bottom layer is to contain a colorant other than a natural oil soluble colorant or in addition to the natural oil soluble colorant, it can be combined with the other liquid ingredients or added subsequently. Under these conditions, natural oil soluble colors become approximately evenly dispersed in the oil phase.

In one preferred embodiment, a natural oil soluble color is combined with a low-percentage tinting amount of a caramel color, that, preferably is negatively charged, and more preferably has a weight average molecular weight of between about 200,000 Daltons and 650,000 Daltons, and may be used to produce a different non-migrating color than either of the component colors would produce alone.

The liquid ingredients are then mixed to effect thorough and complete dispersion, such as by homogenization. Typically, the liquid ingredients are charged into a single or multiple-stage homogenizers at an elevated temperature. The mixture is then passed through the homogenizer at a sufficient temperature and pressure to form a homogenized base.

To the homogenized base are added the remaining ingredients including from about 2 to about 10 wt. %, preferably from about 3 to about 8 wt. %. starch, added as a slurry using the remaining portion of water (the total amount of water added in both portions is from about 5 to about 20 wt. %, preferably from about 10 to about 15 wt. %); and other dry ingredients, such as salt in an amount from about 0.05 to about 2 wt. %, preferably from about 0.75 to about 1.25 wt. %, and flavorants, in an amount from about 0.05 to about 2 wt. %, preferably from about 0.1 to about 1.5 wt. %. If the colorants were not incorporated into the homogenized base, they can be added at this time.

These remaining ingredients are added to the homogenized base using a relatively high level of agitation. An induction mixer is one type of device for providing the desired agitation. After thorough mixing, the mixture is thermally processed, for example in a tube or a scraped-surface heat exchange apparatus so as to best accommodate the increasing viscosity of the mixture during heating. The pudding mixture then is heated to a sufficient temperature for the necessary time required to effect cooking and microbial kill.

In commercial operations it may be desirable to provide a hold tank between the mixing step and the cooking step in order to serve as a buffer against process disruptions. If such a tank is present, the tank should keep the pudding temperature at about 40° F. to retard microbiological growth.

The resulting pudding is cooled to a temperature suitable for filling into a transparent container, such as a transparent plastic cup. Cooling may be effected using either direct or indirect heat with a scraped-surface heat exchanger being typical for indirect heating and steam injection being a typical procedure for applying direct heat. The cooling step should be done while the mix is being subjected to shear conditions. Cooling may be accomplished using plate, tubular and/or scraped-surface heat exchangers. The cooled pudding is then introduced into the cup to form the first layer at a temperature below 140° F., preferably about 90° F.

A similar process is used to prepare a second pudding layer having a different color. After cooling to a suitable temperature for filling, the second pudding is introduced into the transparent plastic cup to form a second layer on top of the first. The process can be repeated as many times as desired to form three or more different layers. The third layer, for example, can be made from a third pudding formulation or it can be made from the material used to form the bottom layer. In some embodiments, of this invention the pudding has two adjacent layers, each with a natural oil soluble colorant, and in other embodiments, one or more of the layers may contain a negatively charged caramel colorant.

After the transparent cup is filled it is sealed, for example, with an adhesively applied foil lid. If an aseptic-packaging process is to be implemented, the process will further include steps of sterilizing the containers and lids into which the sterilized pudding is packaged and then filling the container with pudding in a sterile environment. Such known methods as superheated steam, hydrogen peroxide, ultraviolet light, high-intensity light, etc., are useful for sterilizing the packaging materials, i.e., the transparent container and foil lid. These steps would also be desirable to reduce microbial activity even in the event that a true aseptic process is not being sought, such as when the pudding is placed in a refrigerated distribution system and sterility is not required but extended storage life is desirable.

While the invention has been described in detail with reference to certain preferred embodiments thereof, it will be understood that modifications and variations are within the spirit and scope of that which is described and claimed.

What is claimed is:

1. A multi-layer food product comprising:
   a first milk-based, gel-based layer containing a dispersed oil phase and an oil soluble color within the oil phase, the first gel-based layer having a first color; and
   a second gel-based layer adjacent the first gel-based layer and having a second color different from the first color;
   whereby migration of the oil-soluble food color from the first gel-based layer into the second gel-based layer is minimized.

2. A multi-layer food product according to claim 1, wherein the second gel-based layer is a milk-based layer.

3. A multi-layer food product according to claim 1, wherein the second gel-based layer contains a dispersed oil phase and an oil soluble color within the oil phase.

4. A multi-layer food product according to claim 1, wherein the first layer comprises pudding.

5. A multi-layer food product according to claim 1, wherein the first and second layers each comprise pudding.

6. A multi-layer food product according to claim 1, wherein the first layer comprises yogurt.

7. A multi-layer food product according to claim 1, wherein the first and second layers each comprise yogurt.

8. A multi-layer food product according to claim 1, wherein the oil soluble colorant is a natural oil soluble colorant.

9. A multi-layer food product according to claim 1, wherein the oil soluble colorant is selected from the group consisting of beta-carotene, annatto, paprika oleoresin, and lycopene.

10. A multi-layer food product according to claim 1, wherein the first layer further comprises a caramel color.

11. A multi-layer food product according to claim 10, wherein the caramel color is negatively charged.

12. A multi-layer food product according to claim 10, wherein the caramel color has a weight average molecular weight ranging from about 200,000 Daltons to about 650,000 Daltons.

* * * * *